US010816254B2

(12) United States Patent
Troissinger et al.

(10) Patent No.: US 10,816,254 B2
(45) Date of Patent: Oct. 27, 2020

(54) DEVICE FOR PRODUCING SNOW

(71) Applicants: Peter Troissinger, Hatzendorf (AT); Peter Manuel Schoellauf, Graz (AT); Manuel Ressi, Hermagor (AT)

(72) Inventors: Peter Troissinger, Hatzendorf (AT); Peter Manuel Schoellauf, Graz (AT); Manuel Ressi, Hermagor (AT)

( * ) Notice: Subject to any disclaimer, the term of this patent is extended or adjusted under 35 U.S.C. 154(b) by 647 days.

(21) Appl. No.: 15/327,720

(22) PCT Filed: Jul. 21, 2015

(86) PCT No.: PCT/AT2015/000100
§ 371 (c)(1),
(2) Date: Jan. 20, 2017

(87) PCT Pub. No.: WO2016/011467
PCT Pub. Date: Jan. 28, 2016

(65) Prior Publication Data

US 2017/0211867 A1 Jul. 27, 2017

(30) Foreign Application Priority Data

Jul. 22, 2014 (AT) ..................................... 582/2014

(51) Int. Cl.
*F25C 5/12* (2006.01)
*B02C 19/20* (2006.01)
(Continued)

(52) U.S. Cl.
CPC ................ *F25C 5/12* (2013.01); *B02C 19/20* (2013.01); *B02C 23/18* (2013.01); *B02C 25/00* (2013.01); *F25C 3/04* (2013.01); *F25C 2303/042* (2013.01)

(58) Field of Classification Search
CPC ........ F25C 5/12; F25C 3/04; F25C 2303/042; B02C 19/20; B02C 23/18; B02C 25/00
See application file for complete search history.

(56) References Cited

U.S. PATENT DOCUMENTS 683,299 A * 9/1901 Kronheim ............... A47J 43/25
241/84.4
1,025,513 A * 5/1912 Craven ..................... F25C 5/12
241/92
(Continued)

FOREIGN PATENT DOCUMENTS

CH 368907 4/1963
FR 634732 9/1928
(Continued)

OTHER PUBLICATIONS

International Search Report from corresponding PCT Appln. No. PCT/AT2015/000100 dated Oct. 15, 2015. English translation attached.

*Primary Examiner* — Omar Flores Sanchez
(74) *Attorney, Agent, or Firm* — Grossman, Tucker, Perreault & Pfleger, PLLC

(57) ABSTRACT

A device for producing snow, with a rasp onto which a piece of ice can be pressed by means of a plunger, wherein the rasp and the piece of ice can be brought toward one another in a relative movement (Δv or Δω), and wherein the device has a holding element, for example a guide cylinder, into which a container that is open toward the rasp and contains the piece of ice can be inserted, and wherein a base plate on which the container can be supported is arranged between holding element and rasp. The invention further relates to an electric machine and a hand-held device for producing snow based on the same principle.

16 Claims, 6 Drawing Sheets

(51) Int. Cl.
*B02C 23/18* (2006.01)
*B02C 25/00* (2006.01)
*F25C 3/04* (2006.01)

(56) References Cited

U.S. PATENT DOCUMENTS

| | | | | | |
|---|---|---|---|---|---|
| 1,537,548 | A * | 5/1925 | Peters | A47J 43/25 | 241/273.1 |
| 1,546,242 | A * | 7/1925 | Keith | F25C 5/12 | 241/280 |
| 1,641,699 | A * | 9/1927 | Smith | A23G 9/045 | 241/95 |
| 1,722,031 | A | 7/1929 | Bert | | |
| 1,799,963 | A | 4/1931 | Epstein | | |
| 2,627,377 | A * | 2/1953 | Fletcher | F25C 5/12 | 241/95 |
| 3,064,591 | A * | 11/1962 | Van Zandt | F25C 5/12 | 425/126.1 |
| 4,570,519 | A * | 2/1986 | Motosko, II | B26B 5/007 | 30/283 |
| 4,790,488 | A * | 12/1988 | Borner | A47J 43/25 | 241/168 |
| 5,050,809 | A * | 9/1991 | Rupp | F25C 5/12 | 222/129.1 |
| 5,242,125 | A | 9/1993 | Rupp | | |
| 6,389,836 | B1 * | 5/2002 | Markin | A23G 9/045 | 241/92 |
| 6,813,997 | B1 | 11/2004 | Lin | | |
| 8,096,218 | B2 * | 1/2012 | Klotz | A47J 43/25 | 241/95 |
| 8,438,961 | B2 * | 5/2013 | Repac | B26D 3/283 | 83/440.2 |
| 9,682,490 | B2 * | 6/2017 | Stewart | B26D 7/2628 | |
| 9,937,631 | B2 * | 4/2018 | Wong | B26D 3/283 | |
| 10,160,133 | B2 * | 12/2018 | Hauser | B26D 7/2628 | |
| 10,443,917 | B2 * | 10/2019 | Kim | A23G 9/22 | |
| 2010/0004653 | A1 * | 1/2010 | Rasekhi | A61F 2/4644 | 606/85 |
| 2015/0069161 | A1 * | 3/2015 | Liu | F25C 5/12 | 241/286 |
| 2015/0377539 | A1 * | 12/2015 | Rupp | A47J 43/046 | 241/85 |
| 2016/0069604 | A1 * | 3/2016 | Oh | F25C 5/12 | 241/95 |
| 2017/0135374 | A1 * | 5/2017 | Rupp | A23G 9/28 | |

FOREIGN PATENT DOCUMENTS

| | | |
|---|---|---|
| GB | 374673 | 6/1932 |
| JP | S60-134445 | 9/1985 |
| JP | 2000-300448 | 10/2000 |
| JP | 2002-000191 | 1/2002 |
| WO | 2013/020179 | 2/2013 |

* cited by examiner

DEVICE FOR PRODUCING SNOW

FIELD OF THE INVENTION

The invention relates to a device for producing snow, with a rasp onto which a piece of ice can be pressed by means of a plunger, wherein the rasp and the piece of ice can be moved toward one another in a relative movement. The invention further relates to an electric machine for producing snow based on the same principle, and to a method for producing snow.

BACKGROUND

In the culinary industry, the demand for new or innovative foods is constant. Thus it is known in the art to produce not only ice cream, but also edible snow that has a water base and additives that provide color, flavor and sweetness.

With frozen desserts, a creamy texture is of paramount importance. In conventionally produced frozen desserts, a creamy texture can be achieved by adding emulsifiers or stabilizers to the frozen dessert.

However, health-conscious consumers find the use of additives such as emulsifiers or stabilizers to be undesirable. As in other branches of the food industry, there is a demand in the frozen desserts sector for frozen desserts that contain no artificial additives.

U.S. Pat. No. 5,050,809 discloses a machine for producing crushed ice. With this machine, frozen ice is fed to a rotating and motorized drum that has a plurality of blades. The disadvantage is that only a collection of small ice pieces is produced.

GB 374673 discloses a device for producing snow or ice cream. For this purpose, a refrigerant gas is mixed intensively and rapidly with a liquid in a manually operated mixer. The disadvantage in this case is that filling the device and removing the snow are elaborate processes.

JP 2002/000191 A teaches a method for producing a snow-like frozen dessert. In this case, a piece of ice is cut into thin slivers. The disadvantage of this method is that the handling of the piece of ice as it is being fed to the corresponding device and the handling of the piece of ice during the cutting process are unknown.

U.S. Pat. No. 5,242,125 relates to a portable snow producing device. In this case, ice made from water is fed to a rotating and motor driven drum that has multiple blades. The disadvantage of this teaching is that the amount of ice to be processed must be determined manually and fed into the machine.

SUMMARY

The object of the invention is to provide a device as described in the introductory part with which a portion of snow can be easily and rapidly produced from a piece of ice, and which can be easily and rapidly kept ready for use or prepared for another snow-producing process. It is a further object of the invention to conserve energy in the production of a frozen dessert. This object is achieved by the device according to the invention in that it has a holding element, for example a guide cylinder, into which a container which is open toward the rasp and contains the piece of ice can be inserted, wherein a base plate on which the container can be supported is arranged between holding element and rasp. The object is achieved by the method according to the invention through the following steps: pressing a plunger onto a container that contains a piece of ice and pressing on the piece of ice so as to move it out of an opening in the container toward a rasp, generating a movement of the rasp relative to the container, and collecting the snow that falls out of the rasp in a cup-like receptacle or a flat dish.

A preferred embodiment of the device is characterized in that the rasp and/or the plunger are motor driven.

In one embodiment of the invention, the rasp is embodied as flat and is capable of moving in an oscillating manner.

In a further enhancement of the invention, the rasp is embodied as a drum and is capable of rotating.

In one embodiment of the invention, the rasp is preferably embodied as a circular disk and is capable of rotating.

A preferred embodiment of the device is further characterized in that the holding element is motor driven.

In one embodiment of the invention, the plunger has a surface that is embodied as planar, concave or convex and presses against the container and/or the piece of ice. The electric machine according to the invention for producing snow has a device according to the invention, along with a landing on which a cup-like receptacle or flat dish can be placed, the landing being located beneath the rasp as viewed in the direction of gravity, so that the snow that is produced can fall into the receptacle or onto the dish. The electric machine may also have a control program for the moving the plunger and the rasp in a predefined manner.

In one embodiment of the machine, the plunger can be moved during the snow producing process by means of the control program along a pressure curve, wherein the pressure curve is dependent on the relative velocity $\Delta v$ or a relative angular velocity $\Delta\omega$ between rasp 1 and holding element.

A preferred embodiment of the electric machine is characterized in that it comprises a cooling device for the landing and/or for the device for producing snow with a rasp.

In one embodiment of the invention, the machine comprises a device for adding liquid washing agent, at least onto the rasp, wherein the activation of this device is triggered by the control program.

In one embodiment, the device according to the invention for producing snow may also be designed as a hand-held device, which has a handle to which the flat rasp is fixedly connected, and wherein the base plate is slidably connected to the rasp via a frame with rails. In the following, the invention will be specified in greater detail in reference to embodiment examples illustrated in the set of drawings.

DETAILED DESCRIPTION

In the invention, the creaminess of the frozen dessert is achieved not by artificial additives, but by the form of the frozen dessert as snow. The snowflake-like consistency of the frozen dessert causes it to melt in the consumer's mouth more quickly than conventional frozen desserts. This results in a creamy sensation during consumption. This effect allows frozen compositions that ordinarily are not creamy to be offered as higher quality frozen desserts. Such compositions include frozen desserts to which alcohol has been added, for example, or any other hard freezing frozen dessert variations. In the past, the addition of certain flavorings or ingredients such as cocoa have also been detrimental to the creaminess of frozen desserts. With the method and the device according to the invention, flavored snow of sufficient creaminess can now be produced.

Figure 1:
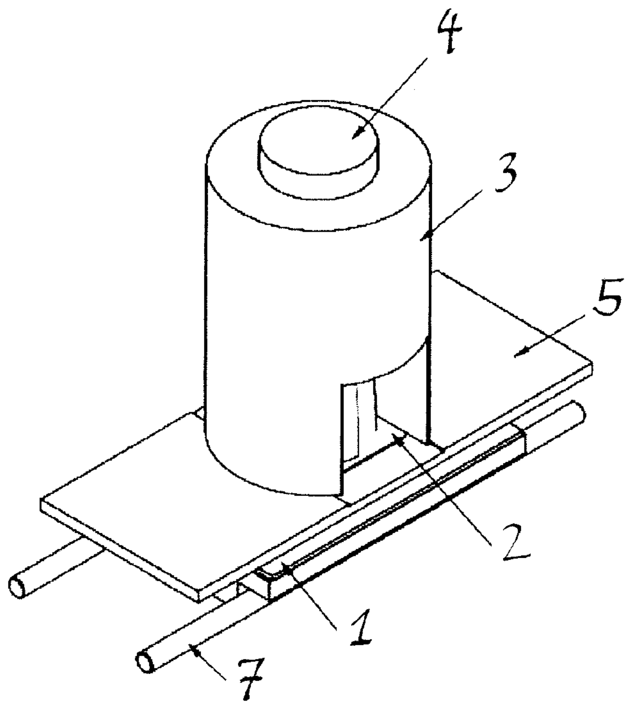
FIG. 1 is an oblique view of the device for producing snow.
Figure 2:
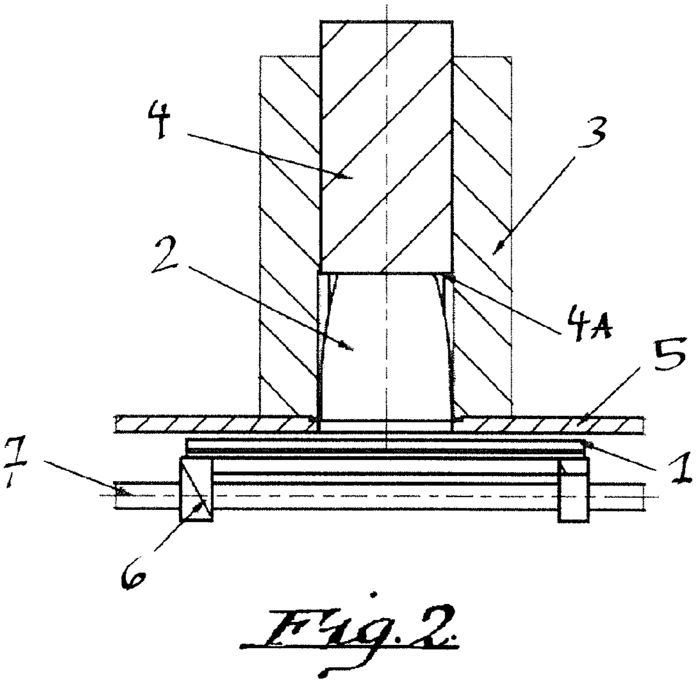
FIG. 2 is a schematic cross-section of the device.

According to FIG. 1 and FIG. 2, a frozen liquid, for example water based, is fed as a piece of ice (not shown) in a container 2, which is guided within a guide cylinder 3. Guide cylinder 3 may also be embodied as a holding element of a different form, as long as container 2 can be held firmly and moved safely at a relative velocity up to a rasp 1. A plunger 4 generates contact pressure on container 2 and thus on the piece of ice in container 2. Container 2 is open toward rasp 1 so that the piece of ice moves toward rasp 1 and is pressed onto it. At the same time, container 2 is supported on a base plate 5, which is located between container 2 and rasp 1 and has an opening for the piece of ice. This prevents container 2 from coming into contact with rasp 1 and rubbing against it. Container 2 is moved together with the holding element (in this case, guide cylinder 3) and/or rasp 1 in a manner that is known and routine with all grating processes. As soon as a relative velocity Δv or a relative angular velocity Δω is present between the piece of ice and rasp 1, rasp 1 begins to shave off the piece of ice, and the snow falls down beneath rasp 1.

The relative velocity between the piece of ice and rasp 1 can be generated by moving either the piece of ice or the rasp 1 or both, linearly or rotationally. With the proper synchronization of contact pressure and relative velocity Δv or Δω, powdered snow-like pieces of the frozen liquid are shaved off. This powdered snow then drops down under its own weight and the prevailing gravity into a collecting container or onto some type of surface.

Various types of rasps, graters, planes or the like may be used as rasp 1. These are substantially flat, stiff material pieces on which at least one material removing element is located. These material removing elements are typically a plurality of punched cutting edges, but may also be of a different design as long as they can be used to shave a piece of ice finely enough.

Container 2, which contains the piece of ice, may be made of any conceivable materials, for example plastics, paper, natural materials, etc. Container 2 is plastically deformed by the plunger 4 during the rasping and pressing process. It is therefore advantageous for the geometry of container 2 to be designed such that the piece of ice can be pressed out of container 2 continuously and no parts of container 2 can reach rasp 1, thus preventing any parts of container 2 from landing in the finished powdery snow.

To achieve the goal of safely and steadily feeding the piece of ice by means of the plunger 4, the end face of plunger 4, that is to say the surface 4*a* thereof that exerts pressure, is designed as planar, concave or convex.

The shape and size of the ice crystals that form the snowflakes of the powdery snow is further dependent on the composition per se of the liquid that forms the piece of ice, on the precise geometry of the blades of rasp 1 and on other parameters. Depending on the interaction of these conditions, a projected snowflake top surface of 0.5 $mm^2$ to 10 $mm^2$ results. The volume of one snowflake is roughly up to 50 $mm^3$.

The powdery consistency of the grated frozen liquid results in a volume increase of up to 800% as compared with the initial volume.

The process of producing a portion of snow is completed when plunger 4 has moved the piece of ice as completely as possible out of container 2 and through rasp 1. The residual volume of ungrated ice should be minimal.

If the above-described container 2 is used, which can be envisioned essentially as a sort of "tab", an unexpected improvement in the hygienic properties of the device as a whole is achieved. Conventional frozen desserts must be consumed within a very short time to avoid the growth of any bacteria on the surface. If the container of the above-mentioned invention is designed to represent one frozen dessert portion, thawing of the surface is necessarily avoided because the container is opened immediately before preparation.

Another major advantage of the aforementioned invention is the processing of frozen liquids. As described above, additives are added to conventional ice cream during production in order to obtain creaminess. Conventional ice cream is deep frozen immediately after production. From that point on, the chain of refrigeration cannot be interrupted until consumption. If it were to be interrupted, then in addition to the increased risk of bacterial contamination, the creaminess of conventional ice cream would be lost because during refreezing, ice crystals of pure water form, corrupting the sensation of creaminess. The invention makes it possible to transport and store the base substance in a liquid state until shortly before consumption. Prior to consumption it is necessary only for the liquid along with container 2 to be deep frozen. This reduces storage and transportation costs, minimizes logistics efforts and saves energy.

Figure 3:
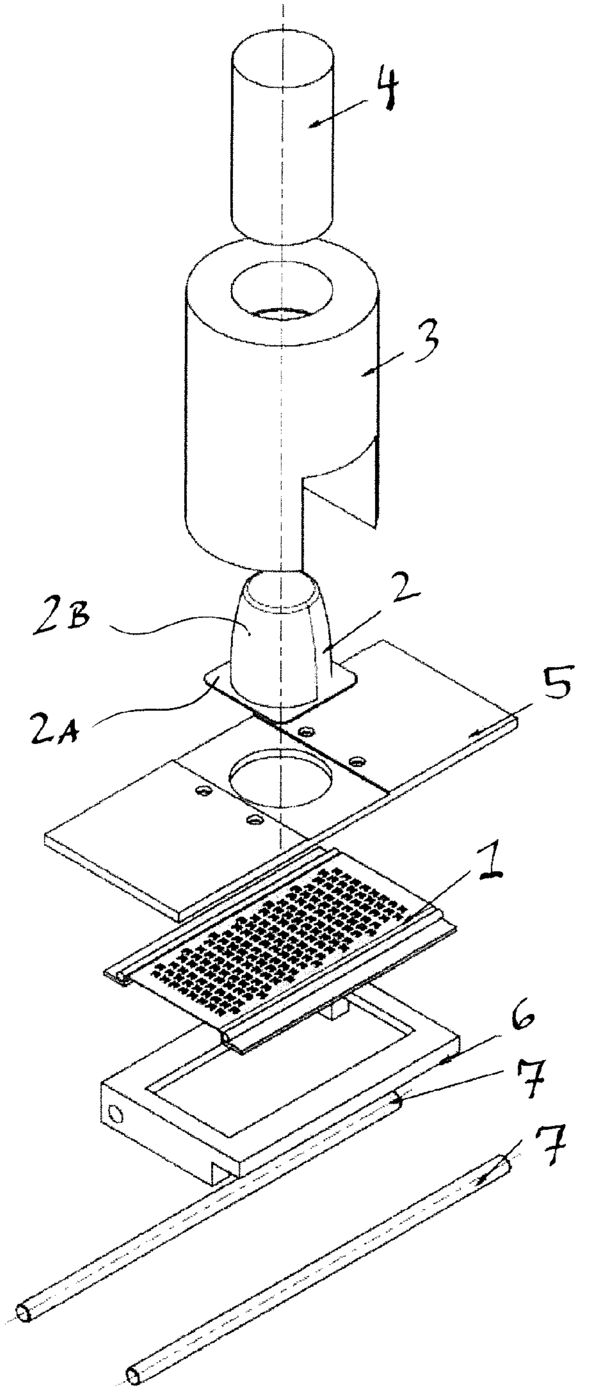
FIG. 3 is an exploded view of the device.
Figure 4:
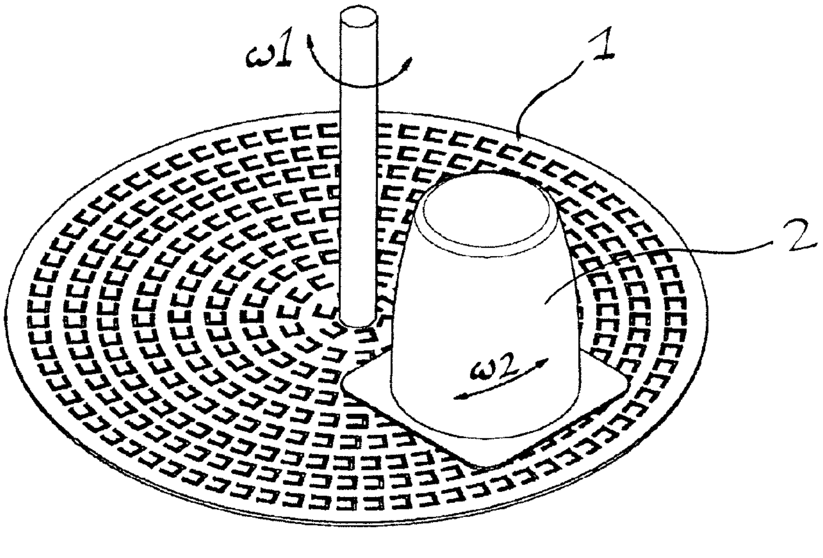
FIG. 4 to FIG. 6 are embodiments of the rasp.
Figure 5:
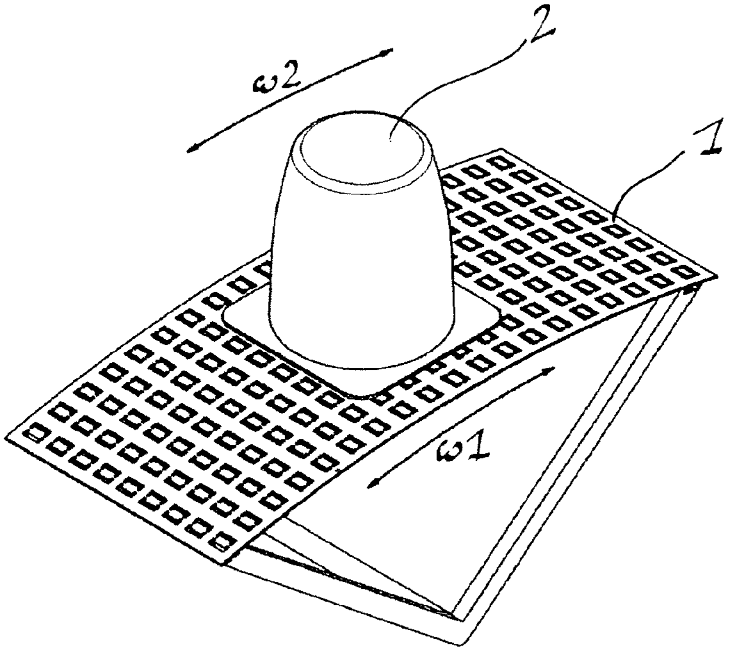
Figure 6:
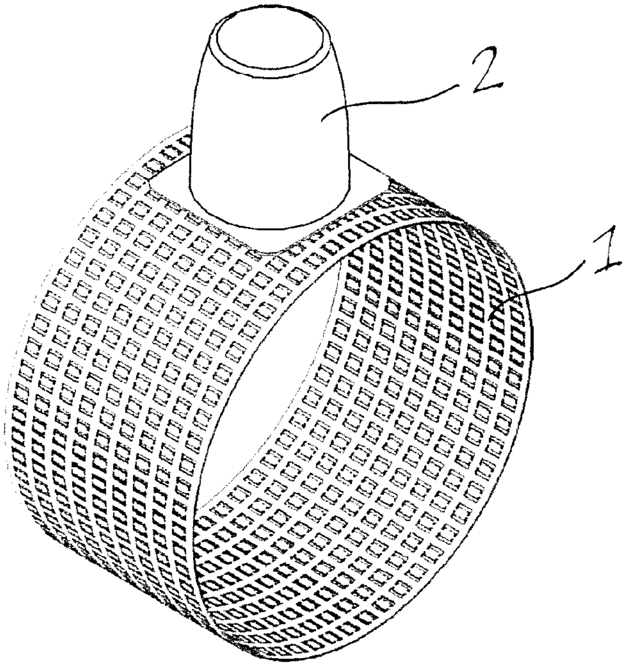

In the embodiment of FIG. 1, FIG. 2 and FIG. 3, rasp 1 is located on a frame 6, which is in turn slidably mounted on rails 7. This allows rasp 1 to be moved oscillatingly back and forth in a predefined manner, and also to be folded up for cleaning purposes before or after the preparation of a portion of snow and the removal of guide cylinder 3 and base plate 5. According to the same embodiment, container 2 is designed as a plastic cup that is open toward the bottom and has a cone 2B and a flange 2A around the opening of container 2. The container can therefore rest stably on base plate 5 and can be pressed on by plunger 4. During the production process, only the piece of ice is then moved toward rasp 1 through an opening in base plate 5.

Figure 9:
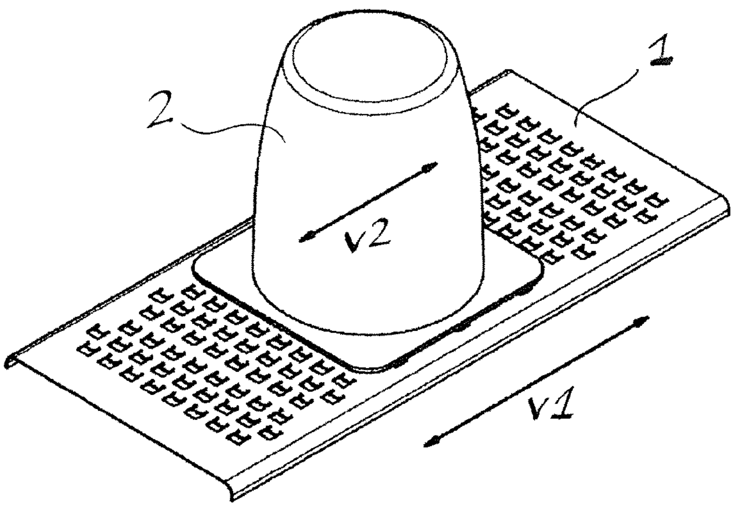
FIG. 9 is an oblique view of the rasp with the container.

The relative velocity Δv or Δω that lies in the plane of the rasp surface and acts perpendicular to the pressing direction of plunger 4 is achieved by bringing the piece of ice together with container 2 to a velocity v2, which is greater than 0, while grater 1 is not moved. The velocity of the grater v1 in this case is 0. Alternatively, the grater is moved (v1≠0) and the piece of ice along with container 2 is held stationary (v2=0). In a third alternative, both grater 1 and the piece of ice along with container 2 are moved (v1≠0, v2≠0, see FIG. 9).

The partial velocities v1 and v2 can be generated by muscle power, or pneumatically, hydraulically or electrically. The section of rasp 1 that is in a shaving connection with the piece of ice is designed as substantially flat. Rasp 1 as a whole may be designed, according to FIGS. 4 to 6 and 9 for example, as a rectangular surface, a circular disk, a drum segment or an entire drum. In the drum configuration, the material removing elements of rasp 1 are located on the circumferential surface of a cylinder. In the case of oscillating or rotating movement, the statements made in reference to the partial velocities v1 and v2 apply to the angular velocity ω1 of rasp 1 or to the angular velocity ω2 of container 2.

Figure 7:
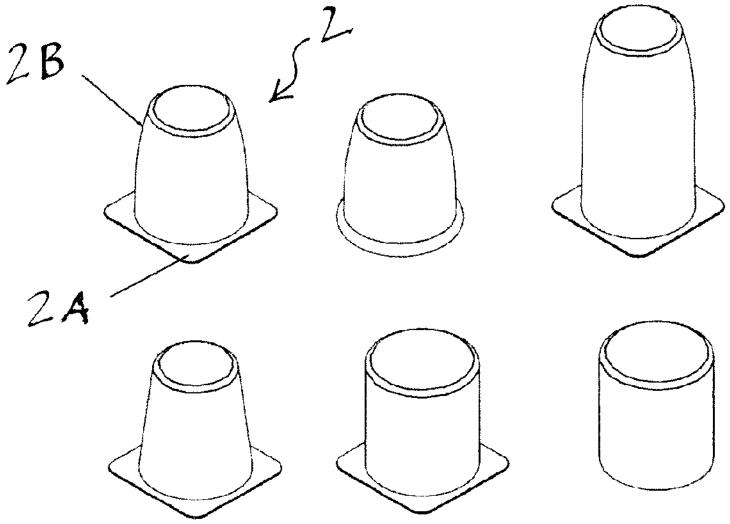
FIG. 7 is embodiments of the container.

According to FIG. 7, container 2 may take a multitude of different forms. It has proven advantageous for a flange 2A to be provided, however this is not necessary as long as container 2 rests firmly on base plate 5 while pressure is being applied, and does not slide partially or completely into rasp 1. Container 2 may be designed as cylindrical, conical or a combination of the two. A container 2 with a circular cross-section is advantageous in terms of functionality, but also in terms of the cost-efficient manufacturing of the container 2.

Figure 8:
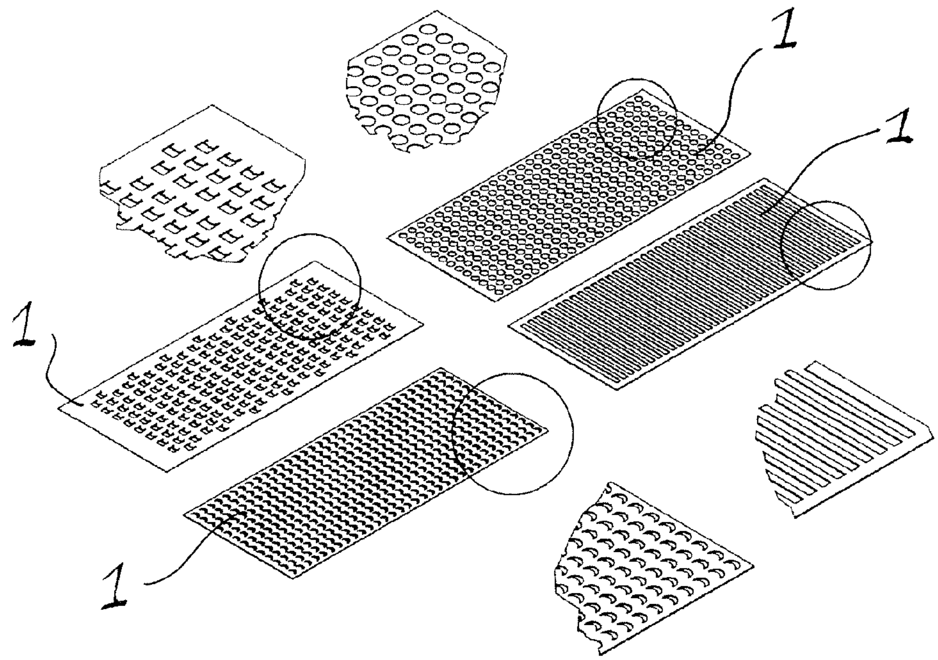
FIG. 8 is embodiments of the rasp.

According to FIG. 8, the geometry of the teeth or blades on rasp 1 may have a variety of designs.

To further simplify the production of a portion of snow, the invention may be a component of an electric machine that begins to operate fully automatically once container 2 has been inserted manually and a start button has been pressed, for example. For this purpose, plunger 4 is motor driven, with a control program triggering a variable contact pressure on plunger 4 based on predefined parameters between the start of snow production and the end of snow production. The contact pressure is presented during each snow producing process from the portion of a container 2 as a pressure curve which is dependent on the relative velocity Δv or a relative angular velocity Δω between rasp 1 and holding element or the piece of ice, or also on the progression of container compression. For instance, it may be advantageous to increase the pressure from the beginning to the end of pressing, or to start at a high pressure and then decrease pressure, or to vary the pressure along a curve.

Furthermore, the relative velocity Δv or Δω between the piece of ice and rasp 1 is determined by a motor. The machine also has a landing, which is located beneath rasp 1 and collects the snow that is produced in a cup-like receptacle or a flat dish. The landing may be a space that is closed on multiple sides, which provides protection during snow production. However, the landing may also be a holding space that is merely reserved for the receptacle or dish.

After snow is produced according to this method, the snow can be removed from the electric machine, and the deformed container 2 needs only to be removed and discarded. To further simplify operation of this machine and make the production process safe, the essential parts or the machine as a whole may be cooled using known cooling devices, such as those used in refrigerators and the like. In addition, all parts of the machine and the snow producing device that come into contact with the ice and the snow may be washed automatically. For this purpose, a washing agent, such as water or water in which detergent substances are dissolved, is conducted by means of known hoses, channels and pumps to the elements of the machine to be cleaned, and ensures a reliable and clean collection of the water used for washing. This also enables the invention to be used in the culinary industry, where adequate electricity and water and waste water connections are available. In that case, the electric machine has a control program that detects, among other things, the presence of the proper container 2, ensures the movement of the plunger and initiation of the relative movement Δv or Δω and the movement of container 2 and rasp 1, triggers the washing process following snow production, and controls and continuously ensures adequate cooling of the machine parts.

Figure 10:
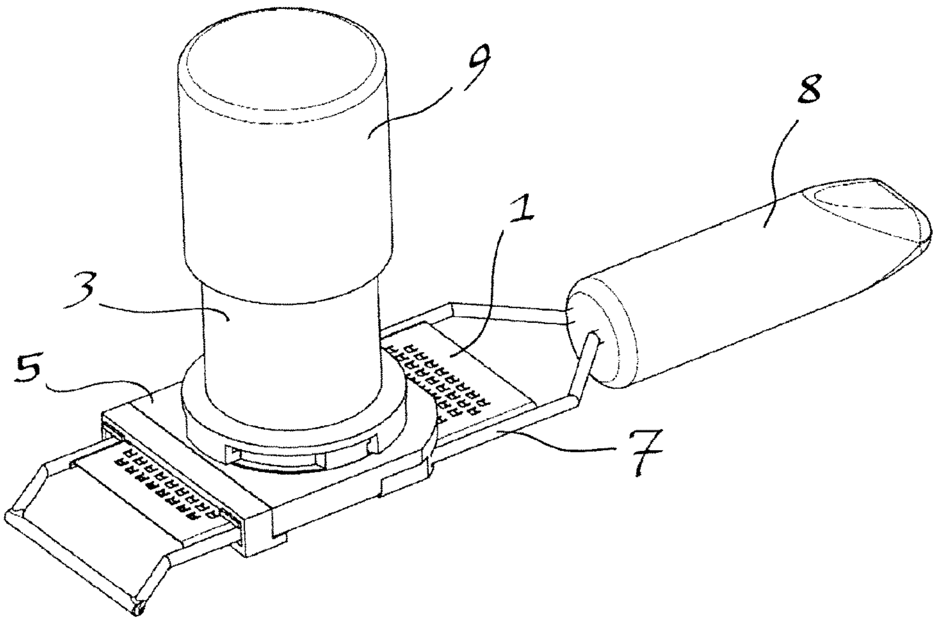
FIG. 10 is a perspective view of the hand-held device.

FIG. 10 shows a further embodiment of the invention as a hand-held device. Rails 7 are connected directly to rasp 1, which is in turn attached to a handle. The container is inserted into guide cylinder 3, which can be connected to base plate 5 by a bayonet lock, for example, and which has at its opposite end a cap 9, which merges into plunger 4 (not shown in FIG. 10). The user holds rasp 1 in a desired location with one hand using handle 8, and presses the plunger via cap 9 onto container 2 with the other hand while at the same time moving container 2 back and forth relative to rasp 1.

What is claimed is:

1. A device for producing snow, comprising:
a plunger movable in a pressing direction,
a rasp onto which a piece of ice is pressable by the plunger,
wherein at least one of the rasp and the piece of ice are movable toward one another in a relative movement direction,
a holding element configured to receive a container insertable therein that is open toward the rasp and contains the piece of ice,
a base plate arranged between the holding element and the rasp, the base plate configured to support the container, and,
wherein, when the container with the ice are received in the holding element, the ice is separated from contact with the plunger by the container, and the plunger is arranged to move within the holding element in the pressing direction to deform the container to remove at least a portion of the piece of ice therefrom.

2. The device according to claim 1, wherein the rasp and/or the plunger is motor drivable.

3. The device according to claim 1, wherein the rasp is embodied as flat and is configured to move in an oscillating manner.

4. The device according to claim 1, wherein the rasp is embodied as a drum and is configured to rotate.

5. The device according to claim 1, wherein the rasp is embodied as a circular disk and is configured to rotate.

6. The device according to claim 1, wherein the holding element is motor drivable.

7. The device according to claim 1, wherein the plunger has a surface which is flat, concave or convex and which presses against the container and/or the piece of ice.

8. The device according to claim 1, wherein the device is an electric device.

9. The electric device according to claim 8, further comprising a control program for a predefined movement of the plunger and the rasp and/or the container.

10. The electric device according to claim 9, wherein the plunger is movable by the control program during a snow production process along a pressure curve that is dependent on a relative velocity Δv or a relative angular velocity Δω between the rasp and the holding element.

11. The electric device according to claim 8, further comprising a cooling device.

12. The electric device according to claim 8, further comprising a further device for adding liquid washing agent, at least onto the rasp, wherein activation of the further device is triggered by the control program.

13. A device for producing snow, comprising:
a plunger,
a rasp onto which a piece of ice is pressable by the plunger,
wherein at least one of the rasp and the piece of ice are movable toward one another in a relative movement,
a holding element configured to receive a container insertable therein that is open toward the rasp and contains the piece of ice, a base plate arranged between the holding element and the rasp, the base plate configured to support the container, a handle which is fixedly connected to the rasp embodied as a flat rasp, wherein the base plate is slidably connected to the rasp via a frame with rails, and wherein the device is a hand-held device.

14. A method for producing snow, comprising:

obtaining a device, the device comprising a plunger, a rasp onto which a piece of ice is pressable by the plunger, wherein at least one of the rasp and the piece of ice are movable toward one another in a relative movement, a holding element configured to receive a container insertable therein that is open toward the rasp and contains the piece of ice, a base plate arranged between the holding element and the rasp, the base plate configured to support the container, inserting a container into the holding element containing a piece of ice, pressing the plunger onto the container that contains the piece of ice, and pressing on the piece of ice to move the ice out of an opening in the container toward the rasp; and producing a movement of the rasp relative to the container, and collecting snow falling from the rasp in a cup-like receptacle or a flat dish.

15. The device according to claim 1, wherein the holding element is a guide cylinder.

16. The electric device according to claim 8, further comprising a landing on which a cup-like receptacle or flat dish is placeable, and wherein the landing is located beneath the rasp as viewed in a direction of gravity, such that snow, when produced, falls into the cup-like receptacle or onto the flat dish.

* * * * *